United States Patent [19]

Mizuhara

[11] 4,448,605

[45] May 15, 1984

[54] DUCTILE BRAZING ALLOYS CONTAINING REACTIVE METALS

[75] Inventor: Howard Mizuhara, Hillsborough, Calif.

[73] Assignee: GTE Products Corporation, Stamford, Conn.

[21] Appl. No.: 446,285

[22] Filed: Dec. 2, 1982

[51] Int. Cl.$^3$ .............................................. C22C 30/00
[52] U.S. Cl. .................. 75/123 H; 75/123 J; 75/123 M; 420/441; 420/501; 420/552; 420/463; 219/129; 228/263.11
[58] Field of Search ............... 420/492, 469, 441, 501, 420/507, 552, 463; 75/123 H, 123 J, 123 M; 428/606, 607; 228/56 R, 263.11, 263.12, 660; 219/146.22, 129

[56] References Cited

U.S. PATENT DOCUMENTS

| 1,912,382 | 6/1933 | Nock ..................................... 420/552 |
| 2,161,468 | 6/1939 | Hensel et al. ........................ 420/469 |
| 2,195,307 | 3/1939 | Hensel et al. ........................ 420/501 |
| 3,948,432 | 4/1976 | Pryor et al. .................... 228/263.11 |

FOREIGN PATENT DOCUMENTS 0289885  12/1969  U.S.S.R. .............................. 420/463

OTHER PUBLICATIONS

Hansen, Constitution of Binary Alloys, 2nd Ed., 1958, pp. 237–239 & pp. 1049–1053.
Shunk, Constitution of Binary Alloys, Second Supplement, 1969, pp. 351–352 & pp. 302–303.

*Primary Examiner*—L. Dewayne Rutledge
*Assistant Examiner*—Debbie Yee
*Attorney, Agent, or Firm*—Donald R. Castle

[57] ABSTRACT

Brazing alloys containing up to a specified amount of a reactive metal selected from the group consisting of titanium, zirconium, vanadium and mixtures thereof and only one metal selected from the group consisting of silver, gold, palladium, iron, nickel, copper and aluminum are ductile and can be rolled into foils.

7 Claims, No Drawings

DUCTILE BRAZING ALLOYS CONTAINING REACTIVE METALS

FIELD OF THE INVENTION

This invention relates to brazing alloys. More particularly it relates to ductile alloy systems containing a reactive metal.

BACKGROUND

Alloys containing a reactive metal are known. These alloys contain above about 7% by weight and are not ductile thus cannot be rolled to a foil in a satisfactory manner.

SUMMARY OF THE INVENTION

Brazing alloys containing up to a specified amount of a reactive metal selected from the group consisting of titanium, zirconium, vanadium and mixtures thereof and only one metal selected from the group consisting of silver, gold, palladium, iron, nickel, copper and aluminum are ductile and can be rolled into foils.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

It has been found that if the content of the reactive metal is above about 4% by weight, a brittle dispersed phase is present in the brazed point. Furthermore, the binary alloys of this invention are ductile. For brazing ceramics to metals, the reliability of the brazed joint is improved when the material is ductile. A ductile alloy is also necessary due to the difference in thermal expansion between ceramics and most metals.

Alloys of low weight percent reactive metal when alloyed with either copper, nickel, aluminum, silver, palladium, gold or copper is ductile and the alloys readily brazed ceramic to metal, metal to metal and ceramic to metal when heated to appropriate temperature in $10^{-5}$ mm Hg vacuum.

Titanium metallurgy is difficult because of the following reasons.

1. Titanium has a high affinity to react with most gases and carbon thus altering the properties of the metal.
2. The high affinity for reaction causes reaction with the crucible material when melting.
3. Titanium alloys with many metals to form a hard intermetallic alloy.

Due to reaction with the crucible surface, a water cooled copper crucible is sometimes used in conjunction with electron beam melting or tungsten electrode melting. A thin solidified layer of the alloys in contact with a water cooled copper crucible (skull melting) acts as a thermal barrier during melting.

Most alloys of titanium, even 5% by weight titanium, alloyed for example with nickel makes cold working very difficult because of the lack of ductility. To obviate the problem of melting titanium and working titanium alloys, a composite system was developed. A composite alloy which is commercially available is 35% Ti—30% Cu—Ni—35% Ti and also 47.5% silver copper eutectic—5% titanium—47.5% silver-copper eutectic.

These composites are ductile and it can be cold worked and annealed so long as the alloying is prevented, however on melting during brazing these alloys will become hard. Also composite systems are expensive to make and scraps cannot be recycled.

Many of these alloy compositions can be made flexible by rapid quench techniques resulting in noncrystalline alloys, however, these alloys on brazing revert back to a brittle crystalline state, therefore, the ductility is not present in brazed joint.

Another method which is used in the vacuum tube industry to braze ceramic to ceramic is to punch out a washer of titanium and nickel. To braze two mated ceramic parts, a layer each of titanium and nickel is placed between the ceramic and the assembly heated to an alloying of Ni-Ti system in about $10^{-5}$ mm Hg vacuum. Another practice is to mix titanium hydride powder with silver powder followed by placing the powder mix between ceramic pieces and heating to melting temperature in vacuum. Titanium hydride decomposes to Ti $+H_2$ at about 350° C. The problem of above two examples are that the exposed titanium acts as a getter and during heat up cycle and the titanium becomes heavily oxidizing in a marginal vacuum resulting in a marginal brazed joint. Many titanium alloys forms intermetallic brittle and hard phases and makes ceramic to metal brazed joint marginal due to thermal expansion mismatch of metal & ceramic. The ductility of brazing filler alloy and the ductility of the resulting brazed joint is a prerequisite when brazing brittle ceramic material to metal especially when the brazed member is subjected to thermal cycle stress.

By lowering the reactive metal content in a ductile alloy or an element a ductile alloy can be prepared such that the amount of titanium present is sufficient to wet and bond to ceramic or nonmetallic material under appropriate temperature and vacuum.

"Reactive metals" as used herein means titanium, zirconium, vanadium and mixtures thereof. The amount of the reactive metal that can be used in the practice of the invention cannot appreciably exceed about 4% by weight thus from about 0.1% to about 4% by weight of reactive metals is utilized. From about 1% by weight to about 3% by weight of the reactive metal is preferred. While titanium is the especially preferred reactive metal in the practice of this invention, the use of mixtures of titanium with either of the other two reactive metals is also preferred.

The second metal which can be utilized in the practice of this invention are the precious metals of silver, gold and palladium, iron and nickel from the ferrous group and copper and aluminium. Since the major use of the brazing alloys of this invention involve brazing of ceramics and metals, it is necessary to utilize metals which will wet both metals and ceramics, have good flowability and the resulting alloys have a liquidus temperature within the brazing temperature suitable for the materials being brazed.

In order to more fuly explain the invention the following detailed examples are presented. All parts, percentages and proportions are by weight unless otherwise indicated.

EXAMPLE 1

Copper alloys are prepared using skull melting equipment and a tungsten electrode with the following compositions. The compositions are rolled to a foil of from about 2 to about 6 mils. All alloys are ductile and workable.

| Copper | 99.0% | 98.0% | 97.0% | 96.0% |
|---|---|---|---|---|
| Titanium | 1.0% | 2.0% | 3.0% | 4.0% |

The foil is placed between ceramic and nickel foil and brazed at about $10^{-5}$ mm Hg vacuum at about 1140° C. All brazed joints are sound.

EXAMPLE 2

As in Example 1 copper alloys are prepared with V—Ti.

| Copper | 97.0% |
|---|---|
| Titanium | 2.1% |
| Vanadium | 0.9% |

The foil is placed between ceramic and nickel foil and brazed at about $10^{-5}$ mm Hg vacuum at about 1130° C. The alloy flowed at a lower temperature than the copper—3% titanium system.

EXAMPLE 3

As in Example 1 nickel alloys are prepared with following compositions.

| Nickel | 99.0% | 98.0% | 97.0% | 96.0% |
|---|---|---|---|---|
| Titanium | 1.0% | 2.0% | 3.0% | 4.0% |

The rolled ductile foil is placed between two pieces of alumina ceramic and heated to about 1480° C. in a vacuum of about $10^{-5}$ mm Hg with excellent flow in all systems.

EXAMPLE 4

98% silver is alloyed with 0.6% vanadium and 1.4% zirconium.

The melted button rolled down easily. Two ceramics are successfully bonded in about $10^{-5}$ mm Hg vacuum at about 1020° C.

EXAMPLE 5

About 97% aluminum is alloyed with about 0.9% vanadium and 2.1% titanium using a button melter with argon atmosphere. The ductile alloy is rolled down to about 6 mils thickness and placed between two alumina substrates. The alloy flows at about 800° C. under about $10^{-5}$ mm Hg vacuum.

EXAMPLE 6

An alloy of about 99.5% gold and about 0.5% Ti is made by skull melting and the button rolled to a foil. A 5 mil thick nickel based alloy sheet sold under the tradename of Kovar by Westinghouse Coporation is brazed to alumina by heating the alloy and the assembly to about 1135° C. in about $10^{-5}$ mm Hg vacuum.

EXAMPLE 7

An alloy of about 3% Ti—97% Pd is prepared with skull melting equipment. The foil prepared from the alloy is used to bond molybdenum to 99.5% alumina substrate by heating to about 1575° C. in about $10^{-5}$ mm Hg vacuum.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article consisting essentially of a ductile brazing foil having a thickness of from about 2 to about 6 mils, said foil being a binary alloy of a reactive metal and a second metal, said reactive metal constituting from about 0.1 to 4% of said alloy and selected from the group consisting of titanium, zirconium, vanadium and mixtures thereof and the balance of said alloy being the second metal which is only one metal selected from the group consisting of silver, iron, nickel, and aluminum.

2. An alloy of claim 1 wherein said reactive metal is present in amounts of from about 1% to about 3% by weight.

3. An alloy of claim 1 wherein said metal is titanium.

4. An alloy of claim 1 wherein said second metal is silver.

5. An alloy of claim 1 wherein said second metal is nickel.

6. An alloy of claim 1 wherein said second metal is iron.

7. An alloy of claim 1 wherein said second metal is aluminum.

* * * * *